United States Patent
Kawachiya et al.

(10) Patent No.: US 9,612,810 B2
(45) Date of Patent: Apr. 4, 2017

(54) PROFILE-BASED PER-DEVICE CODE OPTIMIZATION

(71) Applicant: INTERNATIONAL BUSINESS MACHINES CORPORATION, Armonk, NY (US)

(72) Inventors: Kiyokuni Kawachiya, Kanagawa (JP); Kazuaki Ishizaki, Tokyo (JP); Moriyoshi Ohara, Kanagawa-ken (JP); Mikio Takeuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/835,395

(22) Filed: Aug. 25, 2015

(65) Prior Publication Data
US 2017/0060553 A1  Mar. 2, 2017

(51) Int. Cl.
G06F 9/45 (2006.01)
G06F 9/445 (2006.01)

(52) U.S. Cl.
CPC ............. *G06F 8/447* (2013.01); *G06F 8/443* (2013.01); *G06F 8/52* (2013.01); *G06F 8/60* (2013.01)

(58) Field of Classification Search
None
See application file for complete search history.

(56) References Cited

U.S. PATENT DOCUMENTS

| 8,997,081 B1 | 3/2015 | Manion et al. | |
| 9,185,513 B1* | 11/2015 | Hsieh | G06F 8/447 |
| 2005/0149915 A1* | 7/2005 | Wu | G06F 9/45516 717/137 |
| 2012/0227045 A1* | 9/2012 | Knauth | G06F 9/3863 718/100 |
| 2013/0159122 A1 | 6/2013 | Biswas et al. | |
| 2015/0220670 A1* | 8/2015 | Linehan | G05B 13/04 705/26.63 |

FOREIGN PATENT DOCUMENTS

EP   2662770   11/2013

OTHER PUBLICATIONS

Arnold et al., "Adaptive Optimization in the Jalapeno JVM," OOPSLA '00 Proceedings of the 15th ACM SIGPLAN conference on Object-oriented programming, systems, languages, and applications, Oct. 2000, pp. 47-65, vol. 35 Issue 10, ACM New York, NY, USA.

Bournoutian et al., "On-Device Objective-C Application Optimization Framework for High-Performance Mobile Processors," Design, Automation and Test in Europe Conference and Exhibition (DATE), Mar. 24-28, 2014, pp. 1-6.

Suganuma et al., "Design and Evaluation of Dynamic Optimizations for a Java Just-In-Time Compiler," ACM Transactions on Programming Languages and Systems, Jul. 2005, pp. 732-785, vol. 27, No. 4.

* cited by examiner

*Primary Examiner* — Daxin Wu
(74) *Attorney, Agent, or Firm* — Tutunjian & Bitetto, P.C.; Vazken Alexanian

(57) ABSTRACT

Methods and systems for optimizing an application include optimizing, with a processor on a first device, an application for a second device in accordance with an application execution profile received from the second device to generate a binary for the application that is optimized for use indicated by the application execution profile. The optimized binary is transmitted to the second device.

16 Claims, 3 Drawing Sheets

PROFILE-BASED PER-DEVICE CODE OPTIMIZATION

BACKGROUND

Technical Field

The present invention relates to code optimization and, more particularly, to cloud-based optimization of applications on mobile devices.

Description of the Related Art

Mobile computing devices have become ubiquitous, with each running a suite of pre-built software and applications that are stored locally. Such applications receive frequent updates, either delivered over the air or by docking with a conventional computer. However, as the number, variety, and sophistication of such applications increases, they can put an increasingly high burden on the relatively limited hardware available on such devices. As such, efficient application execution is a pressing concern.

If an application is statically compiled, with the binary being used across multiple devices, it is difficult to choose optimizations for that binary which reflect individual, per-device execution profiles due to the need to accommodate all of the users who will install it. Even if the application is recompiled for the device using an execution profile, the code is optimized only for that specific profile and does not reflect other possibilities.

Meanwhile, just-in-time compilation of an application in the device can reflect per-device execution profiles, but this compilation consumes processing power, memory, and battery life that would otherwise be needed by the user. In addition, devices having similar execution profiles may have similar optimization needs, and in a just-in-time compilation scenario, multiple devices might perform the same compilations, thereby wasting substantial computing power.

SUMMARY

A method for optimizing an application includes optimizing, with a processor on a first device, an application for a second device in accordance with an application execution profile received from the second device to generate a binary for the application that is optimized for use indicated by the application execution profile. The optimized binary is transmitted to the second device.

A system for optimizing an application includes a processor configured to optimize an application for a first user device in accordance with an application execution profile received from the first user device to generate a binary for the application that is optimized for use indicated by the application execution profile. A network interface is configured to transmit the optimized binary to the second device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention perform execution profile collection at individual devices and send the information off-device. The application is then optimized for the specific device based on the received execution profile, and optimized code is sent back to the device. When optimizing the application, code may be reused if an execution profile matches a previously received execution profile for which an optimized application was generated. If an execution profile is common across many devices, it is made the default. Furthermore, if some profile items are applicable across different platforms and processor types, then they may be used to form the basis for optimized defaults on those different platforms.

Figure 1:
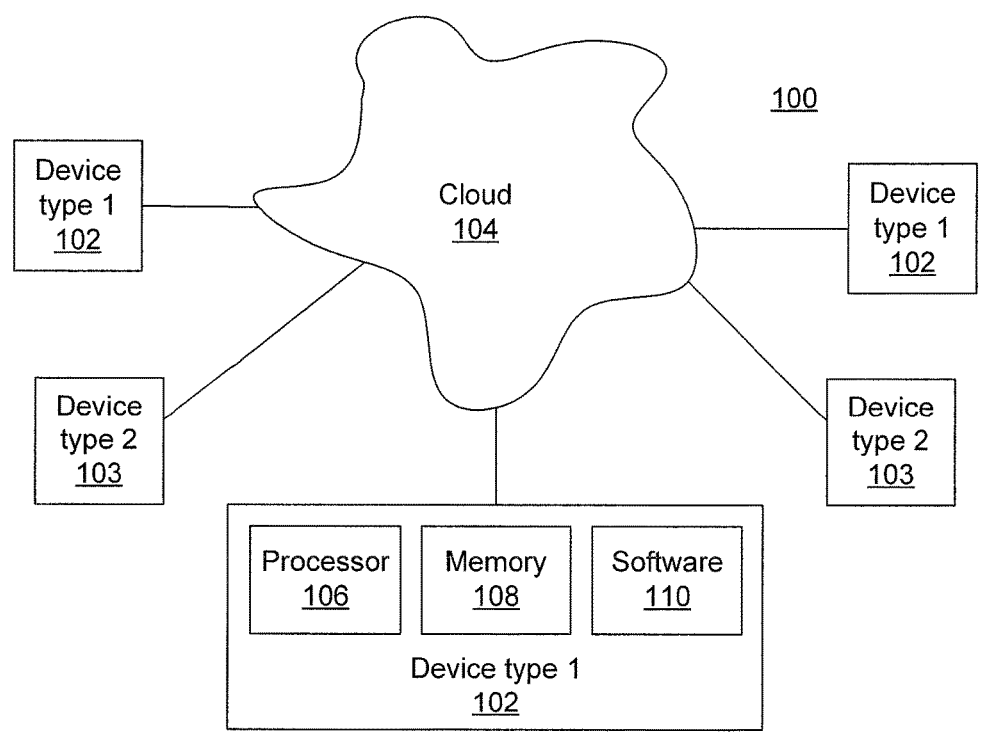
FIG. 1 is a diagram of a system having multiple user devices, each having optimizable application software in accordance with the present principles.

Referring now to FIG. 1, an exemplary optimization service and device ecosystem 100 is shown. A set of devices, in this example having a first type 102 and a second type 103, are in communication with an optimization system 104. In this case, and for the sake of simplicity herein, the optimization system 104 is referred to as a cloud—a distributed, or at least external, set of computing devices that can devote resources to a task as needed—but it should be understood that this computing solution may as easily be implemented as a general purpose computer or application-specific piece of hardware. In one specific example, the optimization system 104 may be implemented as an "app store" system that manages the sale, distribution, and installation of software.

The devices 102 and 103 each represent, for example, some mobile computing device. This may be a smart phone, a laptop computer, or any other network-connected or -connectable computing device. Each device 102 and 103 communicates with the cloud 104 by way of, e.g., the cellular network, wired or wireless Ethernet, or by docking with another network-connected device. The first device type 102 represents a different configuration from the second device type 103, whether in hardware specifications (including, e.g., processor, amount and type of memory available, etc.) or in software (e.g., operating system, runtime environment, etc.).

Each device 102 includes a hardware processor 106, memory 108, and one or more software applications 110 that use the processor 106 and memory 108 to perform one or more functions. The second type of device 103 includes similar components but may differ on the precise configuration and hardware. During execution of a software application 110, the particular operations executed on the processor 106 by the application 110 will vary according to the user's actual use case. For example, one user may demand many computation-intensive operations from an application 110, while another user may use the same application 110 in a less intensive manner, instead relying primarily on calls to memory 108. One specific example of an execution profile may include maintaining a count of the invocation of each method in the application 110. In each case, the devices 102 and 103 record an execution profile and forward that information to the cloud 104. Each execution profile corresponds with a set of potential optimizations that would improve performance of the application 110 as it is being used for that particular user on that particular device. To follow the example above, the more frequently invoked methods may be more highly optimized by the cloud 104, such that a method is optimized only if its frequency exceeds a threshold.

The cloud 104 optimizes the application 110 based on the execution profile, optimizing the application 110 to increase its performance for the device 102 or 103. Optimization may include recompiling the application 110 from source code or may include binary-to-binary optimizations. The cloud 104 then sends an updated binary for the application 110 to the device 102 or 103 that supplied the execution profile. It should be noted that the binary need not be sent immediately, but may instead be sent at some convenient time such as during synchronization or along with system updates. As additional devices report back, some execution profiles will be similar to profiles that have already been received in the cloud 104. In these instances, the cloud 104 will provide a previously compiled binary for the application 110 to the newly requesting device 102 or 103, saving the time and expense of duplicating the work of compiling the application 110.

If a particular execution profile is common across many devices, the cloud 104 will use the optimized binary that corresponds to that common profile as a default, sending it whenever a device 102 or 103 installs the application 110 for the first time. In addition, some optimizations may be applicable across devices types. For example, an execution profile for an application 110 for the first device type 102 may reflect optimizations available for the second device type 103. In this case, the cloud 104 may create a new optimized default binary for the second device type 103 in advance of repeating a specific execution profile for that device type. In this way, the execution profiles from disparate platforms may be used to inform the optimization of each other's software.

It should be noted that, by focusing optimization on the portions of the application 110 that are most frequently used, performance gains can be realized that nearly match the performance gains of a more holistic optimization while reducing optimization time and resources as well as reducing the ultimate binary size to be transmitted to the devices 102 and 103.

Figure 2:
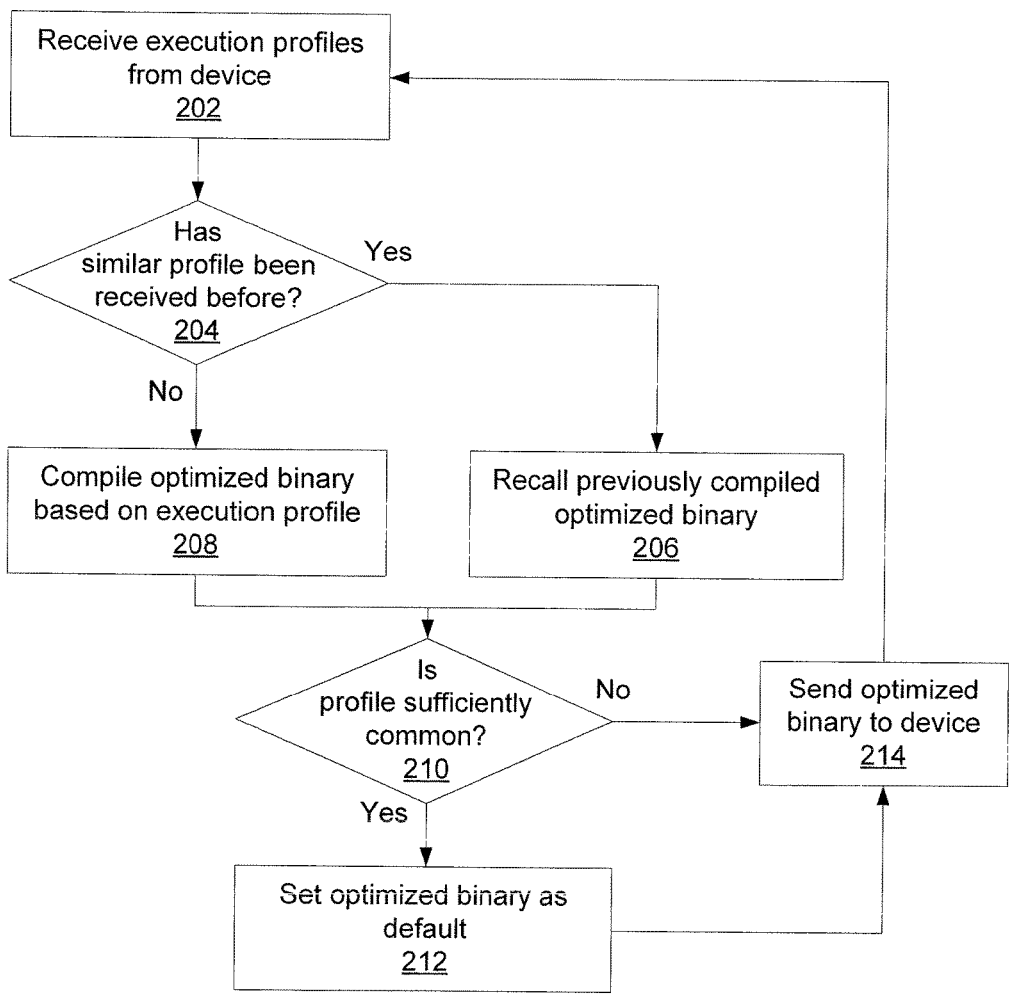
FIG. 2 is a block/flow diagram of a method of optimizing application software in accordance with the present principles.

Referring now to FIG. 2, a method for application optimization is shown. Block 202 receives execution profiles from a device (e.g., 102 or 103). Block 204 determines whether a similar execution profile has been received before, based on if certain profile items which highly affect performance are shared. If so, block 206 recalls a previously compiled optimized binary. If not, block 208 recompiles the optimized binary based on the execution profile.

Block 210 then determines whether the profile is sufficiently common to serve as a default. This may be measured, for example as a threshold percentage of total execution profiles received. If the profile is sufficiently common, the optimized binary may be set as a default in block 212, to be distributed to users in the future upon installing the application 110. It should be noted that a specific optimized binary need not be set as the default, but that instead a default optimized binary may be created using common profile items. In either case, the optimized binary is then sent to the device 102/103 in block 214. Processing returns to block 202 to wait for the next execution profile.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
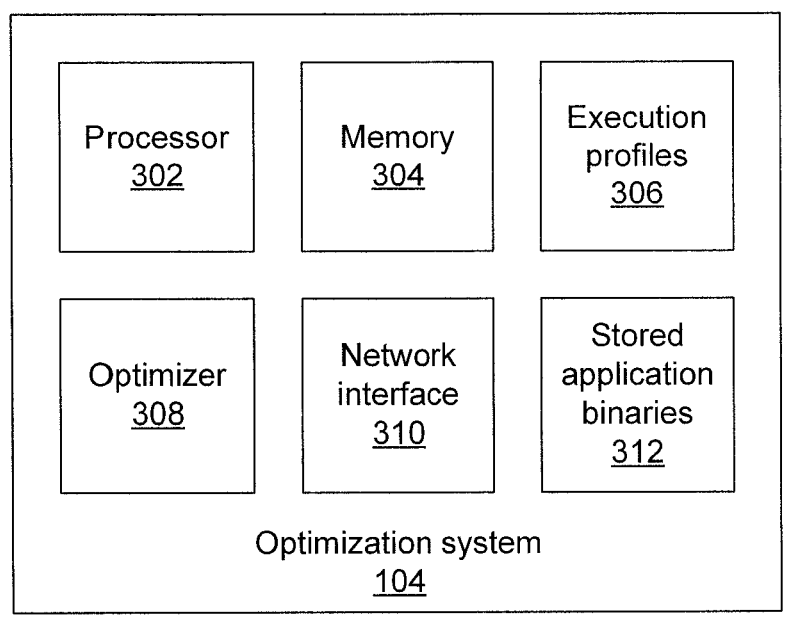
FIG. 3 is a block diagram of a system for optimizing application software in accordance with the present principles.

Referring now to FIG. 3, the optimization system 104 is shown in greater detail. The optimization system 104 may be a single device or may be a "cloud" of devices that handle tasks as needed. The optimization system includes at least one hardware processor 302 and memory 304. The memory 304 stores execution profiles 306 that are received from one or more user devices 102/103 via a network interface 310. The memory also stores source code for one or more applications 110.

An optimizer 308 optimizes the binary for the application 110. As noted above, this may be performed by compiling the source code of the application 110, if available, or by performing binary-to-binary optimizations. When a new execution profile 306 is received, the compiler uses processor 302 to compile an optimized binary in accordance with the execution profile 306. The new optimized binary is stored in the memory 304 to form a stored application binary 312 and is sent to the device 102/103 via the network interface 310. If an execution profile 306 is received that matches a previously stored execution profile 306, the corresponding optimized binary is recalled from the stored application binaries 312 in memory 304 and sent to the device 102/103 via the network interface 310.

It should be noted that the optimization system 104 also determines what binary to send to devices 102/103 that are installing the application 110 for the first time. An initial default binary is created with no optimizations or with best-guess optimizations. This default binary is sent to devices at first, but as execution profiles 306 are received and optimized binaries 312 are generated and stored, the original default is replaced by an optimized binary that better reflects the use of the application 110 on actual devices. In addition, the compiler 308 can cross-compile default binaries platforms and hardware other than those represented by the received execution profiles by gleaning platform-independent optimizations from the execution profiles 306.

Having described preferred embodiments of profile-based per-device code optimization (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for optimizing an application, comprising:
   optimizing, with a processor on a first device, an application for a second device in accordance with an application execution profile received from the second device to generate a first binary for the application that is optimized for use indicated by the application execution profile;
   optimizing, with the processor on the first device, an application for a third device in accordance with the application execution profile received from the second device to generate a second optimized binary for the application, wherein the third device has a different type of processor from a processor of the second device, such that the binary that is optimized for the second device will not run on the third device; and
   transmitting the first optimized binary for the application to the second device and the second optimized binary for the application to the third device.

2. The method of claim 1, wherein the execution profile comprises a frequency of execution for each method in the application.

3. The method of claim 1, wherein optimizing comprises optimizing only those methods in the application which have an execution frequency that exceeds a frequency threshold.

4. The method of claim 1, further comprising storing the optimized binary and the application execution profile.

5. The method of claim 4, further comprising selecting a stored optimized binary if a similar application execution profile has been previously received, wherein said step of optimizing is performed only if no similar application execution profile has been previously received.

6. The method of claim 1, further comprising setting the optimized binary to be a default application binary, to be sent to devices requesting the application for a first time, if a percentage of application execution profiles that match the optimized binary exceeds a threshold.

7. The method of claim 1, wherein optimizing comprises recompiling the application from source code.

8. The method of claim 1, wherein optimizing comprises performing a binary-to-binary optimization that produces an optimized binary without recompiling from source code.

9. A computer readable storage medium comprising a computer readable program for optimizing an application, wherein the computer readable program when executed on a computer causes the computer to perform the steps of:
   optimizing, with a processor on a first device, an application for a second device in accordance with an application execution profile received from the second device to generate a first binary for the application that is optimized for use indicated by the application execution profile;
   optimizing, with the processor on the first device, an application for a third device in accordance with the application execution profile received from the second device to generate a second optimized binary for the application, wherein the third device has a different type of processor from a processor of the second device, such that the binary that is optimized for the second device will not run on the third device; and
   transmitting the first optimized binary for the application to the second device and the second optimized binary for the application to the third device.

10. A system for optimizing an application, comprising:
    a processor configured to optimize an application for a first user device in accordance with an application execution profile received from the first user device to generate a first binary for the application that is optimized for use indicated by the application execution profile and to optimize an application for a second user device in accordance with the application execution profile received from the first user device to generate a second optimized binary for the application, wherein the second user device has a different type of processor from a processor of the first user device, such that the binary that is optimized for the first user device will not run on the second user device; and
    a network interface configured to transmit the first optimized binary for the application to the first user device and the second optimized binary for the application to the second user device.

11. The system of claim 9, wherein the execution profile comprises a frequency of execution for each method in the application.

12. The system of claim 9, wherein the processor is further configured to optimize only those methods in the application which have an execution frequency that exceeds a frequency threshold.

13. The system of claim 9, wherein the processor is further configured to store the optimized binary and the application execution profile in a memory, to select a stored optimized binary if a similar application execution profile has been previously received, and to optimize the application only if no similar application execution profile has been previously received.

14. The system of claim 9, wherein the processor is further configured to set the optimized binary to be a default application binary, to be sent to devices requesting the application for a first time, if a percentage of application execution profiles that match the optimized binary exceeds a threshold.

15. The system of claim 9, wherein the processor is configured to recompile the application from source code to optimize the application.

16. The system of claim 9, wherein the processor is configured to perform a binary-to-binary optimization to optimize the application that produces an optimized binary without recompiling from source code.

* * * * *